US005088449A

United States Patent [19]

Lamb, Sr. et al.

[11] Patent Number: 5,088,449

[45] Date of Patent: Feb. 18, 1992

[54] CALF CATCHING AND HOLDING DEVICE

[76] Inventors: Lloyd E. Lamb, Sr.; Norman E. Alm, both of P.O. Box 384, Helena, Mont. 59624

[21] Appl. No.: 667,242

[22] Filed: Mar. 8, 1991

Related U.S. Application Data

[63] Continuation-in-part of Ser. No. 503,372, Apr. 25, 1990, abandoned.

[51] Int. Cl.[5] .......... A01K 29/00

[52] U.S. Cl. .......... 119/153

[58] Field of Search .......... 119/151, 153; 294/19.1, 294/119.2

[56] References Cited

U.S. PATENT DOCUMENTS

| | | | |
|---|---|---|---|
| 235,675 | 12/1880 | Ewing | 119/153 |
| 873,514 | 12/1907 | Davis | 119/153 |
| 2,179,394 | 11/1939 | Wulff | 119/153 X |
| 2,232,291 | 2/1941 | Thompson | 119/151 |
| 2,499,511 | 3/1950 | Koger | 119/153 |
| 2,704,052 | 3/1955 | Wood | 119/153 |
| 3,224,404 | 12/1965 | De Jong | 119/153 X |
| 3,292,591 | 12/1966 | Wood | 119/153 |
| 3,878,808 | 4/1975 | Mock, Jr. | 294/19.1 X |
| 4,648,352 | 3/1987 | Smith | 119/153 |

FOREIGN PATENT DOCUMENTS

| | | | |
|---|---|---|---|
| 2555020 | 5/1985 | France | 119/29 |

*Primary Examiner*—Robert P. Swiatek
*Assistant Examiner*—Todd E. Manahan

[57] ABSTRACT

The invention is a calf restraining device which allows the user to singlehandedly restrain a calf for the purpose of treating medically or examining. Basically, this calf restrainer consists of a 56" length of ¾" PVC pipe with associated parts and has a ⅜" nylon rope running through the pipe and doubling back to a handle end, outside of the pipe. This creates a larger loop at the handle end which enables the user to insert his hand and wrist therethrough prior to grabbing the handle end. A smaller loop on the portion of the rope outside of the pipe is retained at the handle end by a plastic, elongated, retainer washer which allows the user to slip the smaller loop from the handle end and let it slide down the outside of the pipe until it is stopped by the end cap. The loop so formed by this operation is similar to a lasso and can be easily slipped over a calf's head and a direct pull backwards by the user lets the smaller loop clear the end cap and results in the calf being restrained.

1 Claim, 2 Drawing Sheets

1 2 8 5 7 4 4 6 9 3

CALF CATCHING AND HOLDING DEVICE

CROSS REFERENCE TO RELATED APPLICATIONS

This application is a continuation-in-part of application Ser. No. 07/503,372 filed Apr. 25, 1990, now abandoned.

BACKGROUND OF THE INVENTION

1. Field of the Invention

This invention relates to a calf restrainer incorporating the improvement wherein a noose is formed by a loop sliding down a pipe and stopped by an end cap. The noose so formed is large enough to be placed over a calf's head with ease.

2. Description of Related Art

Various different types of animal restrainers were reviewed and they incorporated some of the general structural features of the calf restrainer of the present invention. However, these previously known devices are not specifically designed to effectively give a person the ability to move freely through a herd of cows and calves checking for newborn calves needing medical attention. The user carries the calf restrainer or snatcher of the instant invention with the smaller loop secured at the handle end, which enables him to move freely in the herd without having a swinging rope loop which would distract and excite the herd.

SUMMARY OF THE INVENTION

The calf snatcher of the present invention is primarily a restraining device comprised of a length of PVC pipe and associated fittings with a nylon rope running through the pipe and having a small loop on one end, and a larger loop on the other end. The smaller loop encircles the pipe and is retained by an elongated washer on the handle end of the pipe while being stored or carried. At the beginning of a calf restraining operation, the smaller loop is released from the elongated retainer washer and slides down the pipe where it is stopped by the end cap on the pipe, thus creating a noose or lasso large enough to go over a calf's head. The larger loop on the handle end of the pipe allows the user to insert his hand therethrough and he is able to grip the handle and use the sighting decal for placing the lasso over the calf's head. With the lasso over the calf's head, a slight backward pull by the user releases the smaller loop from the end cap and tightens the lasso around the calf's neck thus restraining the animal.

The main object of this invention is to provide a calf restrainer which can be used by one person working amongst a herd of cattle without disturbing or agitating the cows and calves.

Another object of this invention provides ease of handling and using.

A further object of this invention is to provide a light weight restrainer built of PVC materials and nylon rope and so constructed to facilitate cleaning and storage of it.

A final object of this invention to be specifically enumerated herein is to provide a calf restrainer in accordance with the preceding objects and which will conform to conventional forms of manufacture, be of simple construction and easy to use so as to provide a device that will be economically feasible, longlasting and maintenance free.

These together with other objects and advantages which will become subsequently apparent reside in the details of construction and operation as more fully herinafter described and claimed, reference being had to the accompanying drawings forming a part hereof, wherein like numerals refer to like parts throughout.

DETAILED DESCRIPTION OF THE INVENTION

Figure 1:
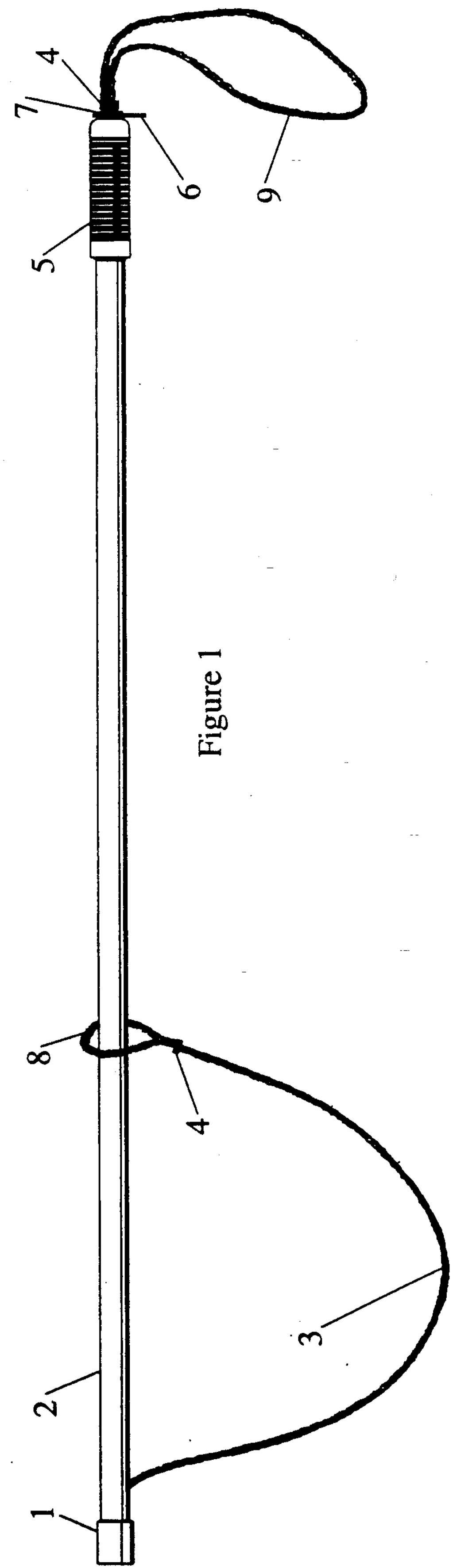
FIG. 1 is an overall view of the calf snatcher constructed in accordance with the present invention.

FIG. 1 is an overall view of the calf snatcher of the instant invention and is composed of the following material and parts: 56 inch length of ¾" PVC pipe (2); ¾" PVC end cap (1) which is glued to one end of the ¾" PVC pipe; and a ⅜" nylon rope (3) with a loop on each end, the length of this rope is approximately 122 inches with the loops pulled tight. This rope (3) runs through the pipe from the handle end and exits the pipe through a ⅜ inch hole drilled in the sidewall 1½ inches from the end of the ¾" PVC end cap (1). The length of the rope traversing through the inside of the pipe from the handle end to where it exits from the cap end remains stationary and there is no movement of this portion of the rope small loop (8) is 12 inches in circumference and is spliced into the ⅜" nylon rope (3) and secured with a wire spring clamp (4), the large loop (9) is 23 inches in circumference and is spliced into the ⅜" nylon rope (3) at the handle end and is secured with a wire spring clamp (4). A rubber handle (5) is glued to the opposite end of the pipe (2) from where the end cap (1) was installed. The rubber handle (5) has a ⅜" hole drilled in the end to allow the rope (3) and the large loop (9) to extend beyond the pipe (2), a ⅜" plastic elongated washer (6) and a ⅜" steel washer (7) also have the ⅜" nylon rope (3) running through them.

Figure 4:
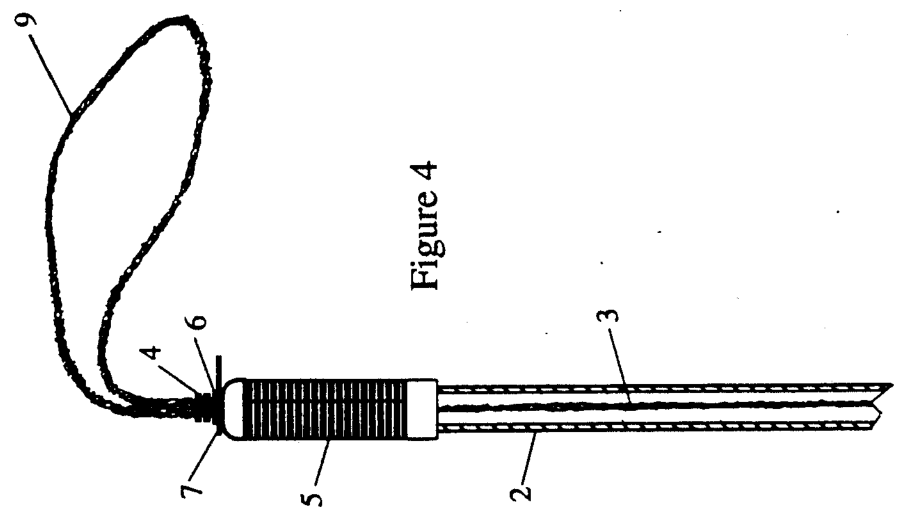
FIG. 4 is a fragmentary view of the handle end showing the rope passing through the pipe.
Figure 2:
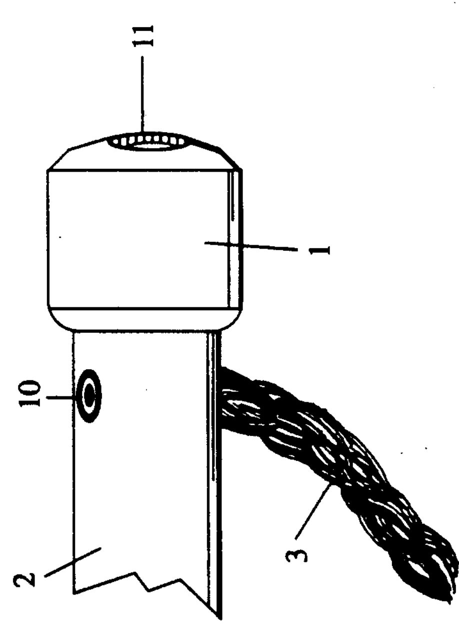
FIG. 2 is an enlarged fragmentary view of the cap end.
Figure 3:
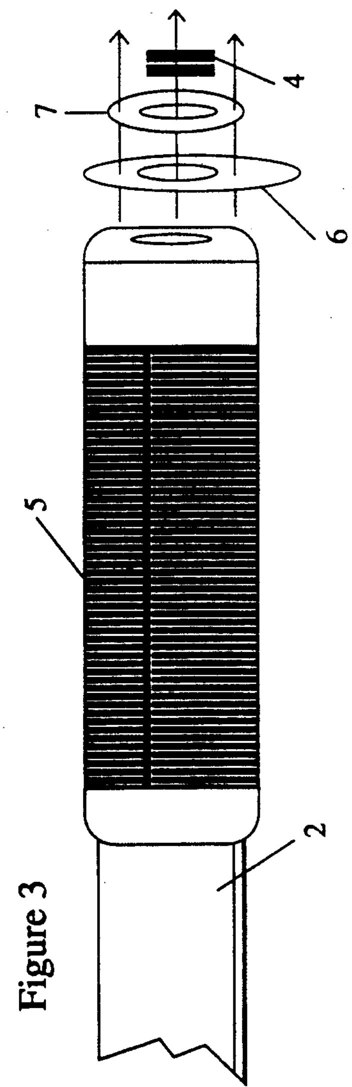
FIG. 3 is an enlarged fragmentary view of the handle end.

FIG. 2 is a partial view detailing the cap end of the pipe and shows the ⅜" nylon rope (3) exiting from the bottom side of the ¾" PVC pipe (2) one and a half inches from the end of the ¾" end cap (1). The plastic sighting decal (10) is glued on the top side of the pipe (2) directly above where the nylon rope (3) exits from the pipe (2). The ⅜" hole (11) drilled in the end of cap (1) is for draining purposes. FIG. 3 is a partial view of the handle end giving a blown up view of the pipe (2), the rubber handle (5), the ⅜" plastic elongated washer (6), the ⅜" steel washer (7) and the wire spring clamp (4). FIG. 4 is a handle end view of the ¾" PVC pipe (2) cut in half lengthwise in order to show the ⅜" nylon rope (3) running through the pipe (2). Other parts shown in FIG. 4 include the rubber handle (5), the ⅜" plastic elongated washer (6), ⅜" steel washer (7), wire spring clamp (4) and the large loop (9).

What we desire to secure by letter patent is:

1. A device for catching and restraining animals comprising:

(a.) an elongate tubular member having first and second ends;

(b.) an end cap secured to the first end of the tubular member so as to close off said first end, the tubular member having an aperture extending through a sidewall thereof and located proximate said first end;

(c.) a tubular handle attached to the second end of the tubular member, the handle having an aperture extending through an end wall thereof;

(d.) a rope having first and second ends, a first loop formed on the first end of said rope and a second smaller loop formed on the second end of said rope, the first loop being positioned proximate the handle on the second end of the tubular member, and a first portion of the rope extending through the aperture in the handle, through the tubular member, and out through the aperture adjacent the first end of said tubular member, said first portion of the rope extending through the tubular member being fixedly secured therein; and (e.) a retaining washer having a peripheral edge extending outwardly beyond the periphery of said handle and being located between the first loop and the end wall of the handle, the rope passing through said washer, the smaller loop passing over the tubular member so that a second portion of the rope extends along the outside of said tubular member forming a noose, the smaller loop being passed over the washer and prevented from sliding back down the tubular member;

whereby, when the smaller loop is manually released from the washer, it slides down the tubular member, passing over the end cap on the first end of said tubular member, and further slides along the second portion of the rope so as to tighten the noose thus created.

* * * * *